(12) United States Patent
Garcia et al.

(10) Patent No.: US 9,958,051 B2
(45) Date of Patent: May 1, 2018

(54) TORSIONALLY COMPLIANT SPROCKET WITH LOCKING MECHANISM

(71) Applicant: BorgWarner Inc., Auburn Hills, MI (US)

(72) Inventors: Mariano Garcia, Ithaca, NY (US); Matthew Crump, Cortland, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days. days.

(21) Appl. No.: 15/520,521

(22) PCT Filed: Oct. 14, 2015

(86) PCT No.: PCT/US2015/055419
§ 371 (c)(1),
(2) Date: Apr. 20, 2017

(87) PCT Pub. No.: WO2016/069260
PCT Pub. Date: May 6, 2016

(65) Prior Publication Data
US 2017/0314665 A1    Nov. 2, 2017

Related U.S. Application Data

(60) Provisional application No. 62/072,134, filed on Oct. 29, 2014.

(51) Int. Cl.
*F16H 55/30* (2006.01)
*F16H 7/06* (2006.01)
(Continued)

(52) U.S. Cl.
CPC ............. *F16H 55/30* (2013.01); *B60K 25/02* (2013.01); *F16H 7/06* (2013.01); *F16H 55/14* (2013.01); *F16H 2055/306* (2013.01)

(58) Field of Classification Search
CPC .... F16H 55/36; F16H 55/14; F16H 2055/306; F16H 7/06; F16H 57/0401; F16H 25/02; F16H 25/36; F16F 15/14; F02B 67/06
See application file for complete search history.

(56) References Cited

U.S. PATENT DOCUMENTS 3,296,887 A    1/1967  Larsen
3,985,035 A *  10/1976  Manning ................ B60K 25/02
                                                    74/15.63
(Continued)

FOREIGN PATENT DOCUMENTS

DE    3918214 A1    12/1990
DE    19611268 A1   9/1997
(Continued)

OTHER PUBLICATIONS

International Search Report for PCT/US2015/055419 dated Jan. 7, 2016.
(Continued)

*Primary Examiner* — William E Dondero
*Assistant Examiner* — Robert T Resse
(74) *Attorney, Agent, or Firm* — Young Basile Hanlon & MacFarlane, P.C.

(57) ABSTRACT

A torsionally compliant sprocket system includes a first sprocket (250); a second sprocket (230) mounted in side-by-side relation to the first sprocket (250); a resilient member (270) that resiliently couples the second sprocket (230) to the first sprocket (250) to allow limited angular rotation of the second sprocket (230) with respect to the first sprocket (250); and a locking structure (300, 600, 700) that is biased toward an engaged position in which angular motion of the second sprocket (230) with respect to the first sprocket (250) is restrained and moves in response to rotation of the first sprocket (250) to a disengaged position in which angular
(Continued)

motion of the second sprocket (230) with respect to the first sprocket (250) is permitted.

15 Claims, 5 Drawing Sheets

(51) Int. Cl.
*F16H 55/14* (2006.01)
*B60K 25/02* (2006.01)

(56) References Cited

U.S. PATENT DOCUMENTS

| | | | |
|---|---|---|---|
| 4,139,995 A | 2/1979 | Lamarche | |
| 4,255,946 A | 3/1981 | Hansen | |
| 4,328,879 A * | 5/1982 | Tone | B62M 9/00 180/219 |
| 4,412,606 A | 11/1983 | Loizeau | |
| 4,638,684 A | 1/1987 | Maucher | |
| 5,245,889 A | 9/1993 | Kohno et al. | |
| 5,560,267 A | 10/1996 | Todd et al. | |
| 5,579,665 A | 12/1996 | Mott et al. | |
| 5,619,887 A | 4/1997 | Simpson | |
| 5,655,416 A | 8/1997 | Mott et al. | |
| 5,667,047 A | 9/1997 | Weiss et al. | |
| 5,720,475 A | 2/1998 | Duclos | |
| 5,816,924 A | 10/1998 | Kajitani et al. | |
| 5,823,880 A | 10/1998 | Kajitani et al. | |
| 5,935,007 A | 8/1999 | Yang | |
| 6,109,227 A | 8/2000 | Mott | |
| 6,161,512 A | 12/2000 | Beels van Heemstede | |
| 6,234,127 B1 * | 5/2001 | Simpson | F16F 15/1204 123/192.2 |
| 6,250,265 B1 | 6/2001 | Simpson | |
| 6,253,633 B1 | 7/2001 | Mott | |
| 6,283,076 B1 | 9/2001 | Simpson | |
| 6,311,655 B1 | 11/2001 | Simpson et al. | |
| 6,481,402 B1 | 11/2002 | Simpson et al. | |
| 6,854,580 B2 | 2/2005 | Braford, Jr. | |
| 7,318,400 B2 | 1/2008 | Lipke et al. | |
| 8,555,836 B2 | 10/2013 | David et al. | |
| 8,579,713 B2 | 11/2013 | Grimmer | |
| 8,677,849 B2 | 3/2014 | Simpson | |
| 8,677,961 B2 | 3/2014 | Fischer | |
| 2007/0056544 A1 * | 3/2007 | Purcilly | F01L 1/02 123/90.31 |
| 2016/0003340 A1 * | 1/2016 | Crump | F16H 55/30 474/161 |

FOREIGN PATENT DOCUMENTS

| | | |
|---|---|---|
| EP | 0987471 A2 | 3/2000 |
| JP | H01182651 A | 7/1989 |
| JP | H0694078 A | 4/1994 |

OTHER PUBLICATIONS

First Office Action for PCT/US2015/055419/KR-10-2017-7012367 dated Aug. 10, 2017, by the Korean Intellectual Property Office.
Translation of First Office Action for PCT/US2015/055419/KR-10-2017-7012367 dated Aug. 10, 2017, by the Korean Intellectual Property Office.

* cited by examiner

TORSIONALLY COMPLIANT SPROCKET WITH LOCKING MECHANISM

CROSS-REFERENCE TO RELATED APPLICATIONS

This application is a U.S. National Stage under 35 U.S.C. § 371 of International Patent Application No. PCT/US2015/055419 filed on Oct. 14, 2015, which claims the benefit of priority from U.S. Provisional Patent Application No. 62/072,134, filed on Oct. 29, 2014, and which is incorporated herein in its entirety be reference.

BACKGROUND

In the field of chain drive systems for vehicles, torsionally compliant sprockets can be used to isolate chain drives from torsional vibrations. Compliant sprockets can include a resilient element to introduce some compliance between the sprocket shaft and the chain or gear. The resilient element acts as a mechanical low-pass filter that reduces the intensity of the torsional vibrations experienced at the chain or gear relative to those at the sprocket shaft. Typical designs include a sprocket split into inner and outer or front and rear parts that are connected by a resilient element such as a torsion spring. Known designs tend to be constrained by performance requirements at engine idle, because the firing order excitations are close to the resonant frequency of the chain-sprocket system at low speed.

SUMMARY

One aspect of the disclosed embodiments is a torsionally compliant sprocket system including a first sprocket and a second sprocket that is mounted in side-by-side relation to the first sprocket. A resilient member resiliently couples the second sprocket to the first sprocket to allow limited angular rotation of the second sprocket with respect to the first sprocket. A locking structure is biased toward an engaged position in which angular motion of the second sprocket with respect to the first sprocket is restrained. The locking structure moves in response to rotation of the first sprocket to a disengaged position in which angular motion of the second sprocket with respect to the first sprocket is permitted.

Another aspect of the disclosed embodiments is a torsionally compliant sprocket system for an engine that includes a crankshaft that rotates on an axis. The torsionally compliant sprocket system includes a hub portion mounted on the crankshaft, a crankshaft drive sprocket disposed on the hub portion such that it is restrained from rotating with respect to the hub portion, and a balance shaft drive sprocket disposed on the hub portion in side-by-side relation to the crankshaft drive sprocket. A resilient member that resiliently couples the balance shaft drive sprocket to the crankshaft drive sprocket to allow limited angular rotation of the balance shaft drive sprocket with respect to the crankshaft drive sprocket. A locking structure is biased toward to an engaged position in which angular motion of the balance shaft drive sprocket with respect the crankshaft drive sprocket is restrained. The locking structure moves in response to rotation of the crankshaft drive sprocket to a disengaged position in which angular motion of the balance shaft drive sprocket with respect to the crankshaft drive sprocket is permitted. The locking structure moves from the engaged position to the disengaged position in response to rotation of the hub portion above a threshold rotational speed and moves from the disengaged position to the engaged position in response to rotation of the hub portion below the threshold rotational speed.

BRIEF DESCRIPTION OF THE DRAWINGS

The description herein makes reference to the accompanying drawings, wherein like referenced numerals refer to like parts throughout several views, and wherein.

DETAILED DESCRIPTION

The disclosure herein is directed to a torsionally compliant sprocket system with a locking structure. The torsionally compliant sprockets described herein include a compliant sprocket that is mounted to a hub using a resilient member that absorbs torsional input vibrations while the compliant sprocket rotates with the hub. The locking structure is engaged at low rotational speeds to reduce or eliminate vibrations that would result when the torsional input vibrations are close to the resonant frequency of the chain-sprocket system.

Figure 1:
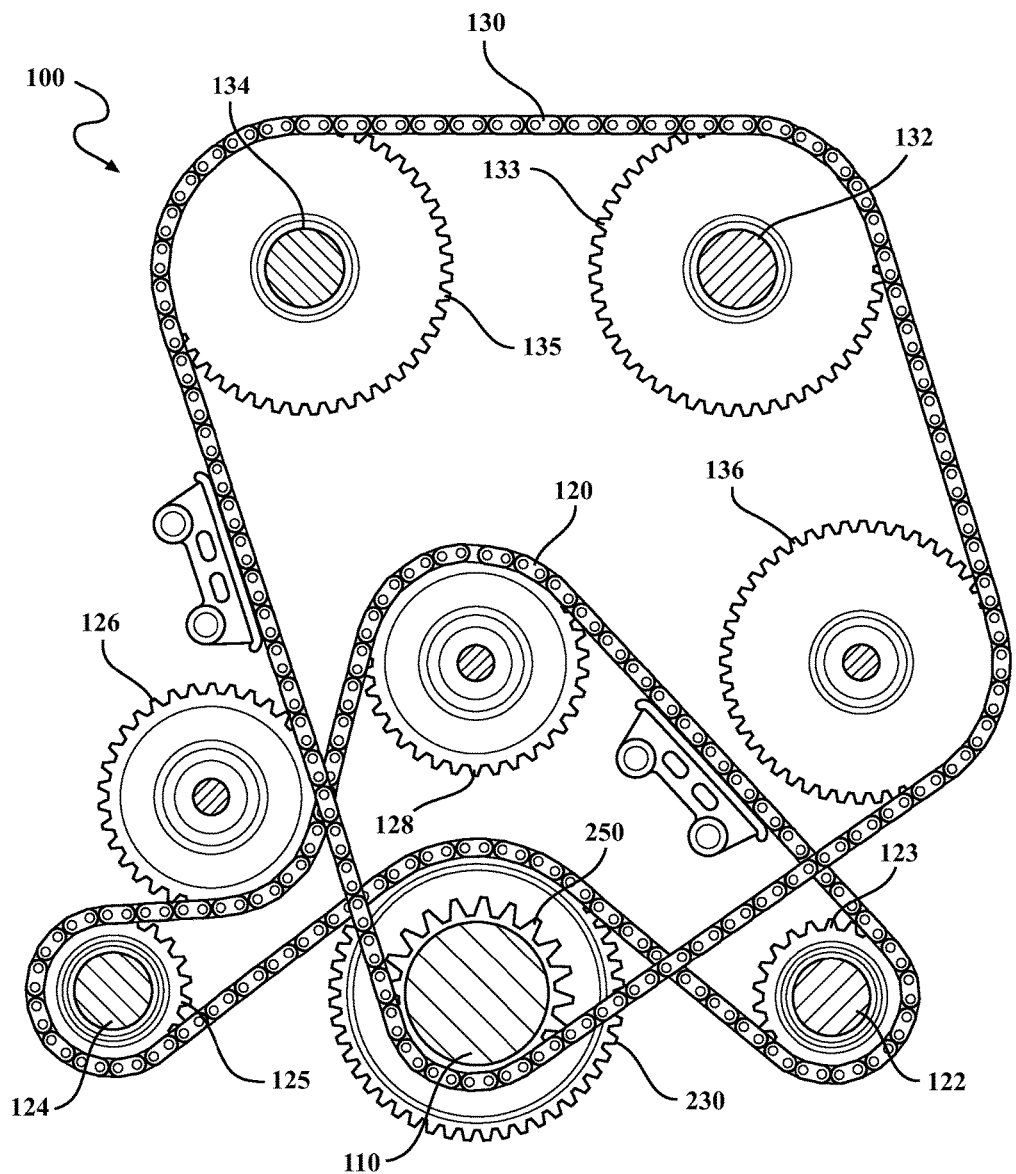
FIG. 1 is an illustration showing a crankshaft and balance shaft drive system for an internal combustion engine.

FIG. 1 is an illustration showing a crankshaft and balance shaft drive system 100 for an internal combustion engine. A torsionally compliant sprocket assembly 200 is connected to a crankshaft 110 of the internal combustion engine. The torsionally compliant sprocket assembly 200 includes a balance shaft drive sprocket 230 and a crankshaft drive sprocket 250. The crankshaft and balance shaft drive system 100 is an example of a system in which the torsionally compliant sprocket assembly 200 can be used. It should be understood that the torsionally compliant sprocket assembly 200 can be used in other applications.

The balance shaft drive sprocket 230 drives a first chain 120. The first chain 120 drives one or more balance shafts, such as a first balance shaft 122 and a second balance shaft 124 that are driven by a first balance shaft sprocket 123 and a second balance shaft sprocket 125, respectively. Each of the first balance shaft sprocket 123 and the second balance shaft sprocket 125 are engaged with the first chain 120. The first chain 120 can also drive, as examples, an accessory drive sprocket 126 and an idler sprocket 128. In an alternative implementation, the balance shafts can be driven by a gear train. In such an implementation, the sprockets are replaced by gears, and the chain is replaced by a gear train.

The crankshaft drive sprocket 250 drives a second chain 130. The second chain 130 drives one or more camshafts, such as a first camshaft 132 and a second camshaft 134 that are driven by a first camshaft sprocket 133 and a second camshaft sprocket 135, respectively. Each of the first camshaft sprocket 133 and the second camshaft sprocket 135 are engaged with the second chain 130. The second chain 130 can also drive, as an example, an idler sprocket 136.

Figure 2:
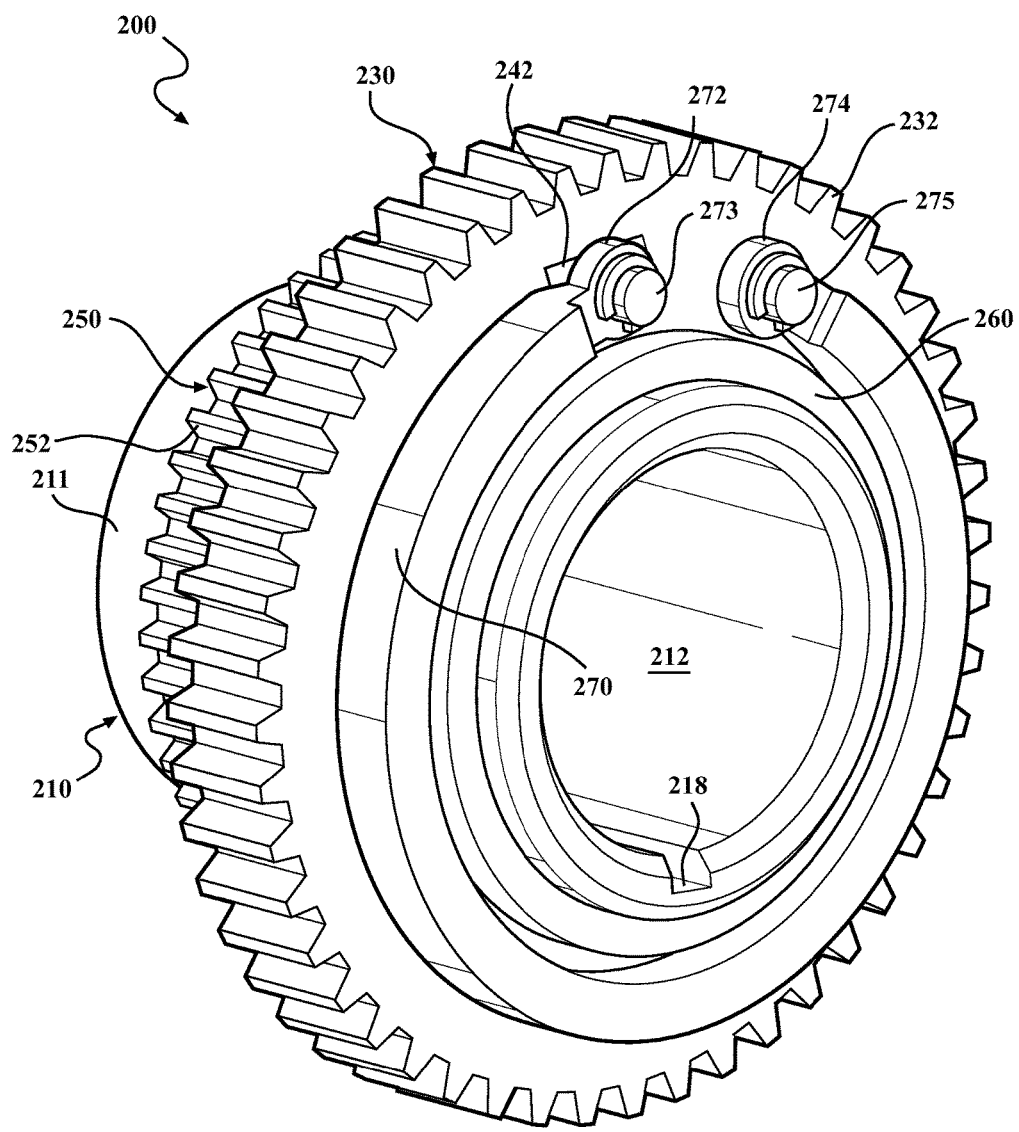
FIG. 2 is a perspective view showing a torsionally compliant sprocket that includes a locking structure according to a first example.
Figure 3:
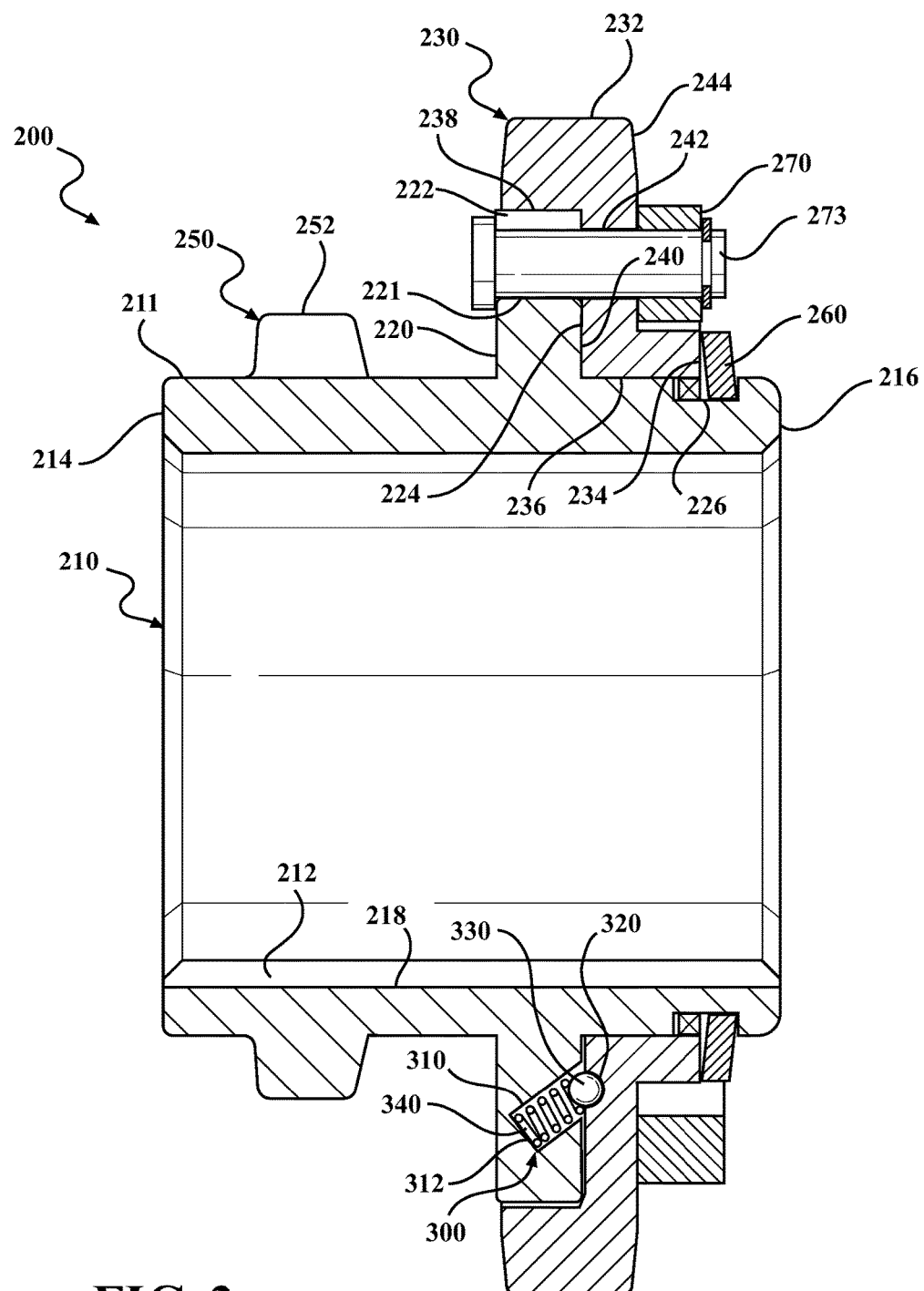
FIG. 3 is a side cross-section view of the torsionally compliant sprocket of FIG. 2.

As shown in FIGS. 2-3, the torsionally compliant sprocket assembly 200 includes a hub portion 210 and the balance shaft drive sprocket 230. The hub portion 210 is annular and is mounted to the crankshaft 110 by sliding the hub portion 210 onto the crankshaft 110 such that the crankshaft 110 is received in a generally cylindrical bore 212 that extends axially through the hub portion 210. When seated on the crankshaft 110, a first end 214 of the hub portion 210 is disposed adjacent to the engine, and a second end 216 of the hub portion 210 is disposed opposite the vehicle. So that the hub portion 210 rotates in unison with the crankshaft 110, an engaging structure such as a spline 218 can be formed on an interior surface of the hub portion 210 along the generally cylindrical bore 212. The spline 218 is configured to engage a complementary structure that is formed on the crankshaft 110, and this engagement prevents rotation of the hub portion 210 with respect to the crankshaft 110.

The crankshaft drive sprocket 250 is disposed on the hub portion 210 at a location that is axially spaced from the first end 214 of the hub portion 210. The crankshaft drive sprocket 250 is configured to engage a chain, such as by a plurality of teeth 252 that are formed on the crankshaft drive sprocket 250 and extend radially outward from an outer periphery 211 of the hub portion 210. In the illustrated example, the crankshaft drive sprocket 250 is formed as an integral part of the hub portion 210. As an alternative, the crankshaft drive sprocket 250 can be formed separate from the hub portion 210 and fixed both axially and rotationally to the hub portion 210 such that the crankshaft drive sprocket 250 moves in unison with the hub portion 210.

An annular flange 220 is formed on the hub portion 210 between the crankshaft drive sprocket 250 and the second end 216 of the hub portion 210. In the illustrated example, the annular flange 220 is an integrally formed part of the hub portion 210. An outer periphery 222 of the annular flange 220 has an outside diameter that is greater than the nominal outside diameter of the outer periphery 211 of the hub portion 210. A radial face 224 of the annular flange 220 faces the second end 216 of the hub portion 210, and extends in a plane that is perpendicular to the axial direction of the hub portion 210.

The balance shaft drive sprocket 230 is configured to engage a chain, such as by a plurality of teeth 232 that are formed on the balance shaft drive sprocket 230 and extend radially outward. The balance shaft drive sprocket is disposed on the hub portion 210 between the annular flange 220 and the second end 216 of the hub. The balance shaft drive sprocket 230 is seated against the outer periphery 222 and the radial face 224 of the annular flange 220. In order to keep the balance shaft drive sprocket 230 seated against the annular flange 220 and restrain it from moving axially toward the second end 216 of the hub portion 210, a fastening element such as a snap ring or wave spring washer 260 engages a leading face 234 of the balance shaft drive sprocket 230. The wave spring washer 260 is disposed in an annular groove 226 that is formed on the hub portion 210 and extends inward from the outer periphery 211 of the hub portion 210.

The balance shaft drive sprocket 230 has a stepped inner periphery including a first inner surface 236 and a second inner surface 238. The first inner surface 236 defines a smaller inside diameter than the second inner surface 238. The first inner surface 236 is adjacent to the leading face 234 and is seated against the outer periphery 211 of the hub portion 210. The second inner surface 238 faces the outer periphery 222 of the annular flange 220. An internal face 240 extends from the first inner surface 236 to the second inner surface 238 and lies in a plane that is perpendicular to the axial direction of the hub portion 210. The internal face 240 is oriented toward and is adjacent to the radial face 224 of the annular flange 220.

The balance shaft drive sprocket 230 is connected to the hub portion 210 by a resilient member that allows limited angular rotation of the balance shaft drive sprocket 230 with respect to the hub portion 210 and the crankshaft drive sprocket 250. The resilient member allows for relative rotation to absorb vibrations transmitted from the crankshaft 110, while urging the balance shaft drive sprocket 230 back toward a neutral position with respect to the hub portion 210 and the crankshaft drive sprocket 250. In the illustrated example, the resilient member is a planar torsion spring 270 that is connected to the hub portion 210 and to the balance shaft drive sprocket 230.

The planar torsion spring 270 extends from a first end 272 to a second end 274. At the first end 272, the planar torsion spring 270 is connected to a first pin 273. The first pin 273 connects the first end 272 of the planar torsion spring 270 to the annular flange 220 of the hub portion 210. The first pin 273 is seated in an aperture 221 that is formed through the annular flange 220. The diameter of the aperture 221 is complementary to the outside diameter of the first pin 273, such that the position of the first pin 273 with respect to the annular flange 220 remains fixed. Accordingly, the first pin 273 moves in unison with the hub portion 210.

Because the balance shaft drive sprocket 230 is disposed between the annular flange 220 and the planar torsion spring 270, an arcuate slot 242 is formed through the balance shaft drive sprocket 230 from the internal face 240 to an external face 244. Thus, the first pin 273 extends through the arcuate slot 242 from the annular flange 220 to the planar torsion spring 270. The arcuate slot 242 is annularly elongate, and extends along a circular arc that has its radial center along the axis of rotation of the balance shaft drive sprocket 230. Because the annular length of the arcuate slot 242 is greater than the diameter of the first pin 273, the balance shaft drive sprocket 230 is able to rotate through a limited range of angular rotation with respect to the hub portion 210, with the range of angular rotation being limited when the first pin 273 reaches one of the ends of the arcuate slot 242

A second pin 275 is connected to the balance shaft drive sprocket 230. This connection is made in a manner that does not permit movements of the second pin 275 with respect to the balance shaft drive sprocket. For example, the second pin 275 can be seated in a complementarily sized aperture (not shown) that extends through the balance shaft drive sprocket 230. The planar torsion spring 270 thus transfers rotational force from the hub portion 210 to the balance shaft drive sprocket 230 while absorbing crankshaft vibrations. The planar torsion spring 270 has a rest position, which is the position that it will return to absent application of external forces. When the planar torsion spring 270 is in its rest position, the balance shaft drive sprocket 230 is in a neutral position with respect to the crankshaft drive sprocket 250 and is in phase with respect to the camshaft. While absorbing crankshaft vibrations, the spring force exerted by the planar torsion spring 270 urges the balance shaft drive sprocket 230 toward its neutral position with respect to the crankshaft drive sprocket 250.

As seen in FIG. 3, the torsionally compliant sprocket assembly 200 includes a locking structure 300. The locking structure 300 is operable to move between an engaged position and a disengaged position. In the engaged position, angular motion of the balance shaft drive sprocket 230 with respect to the hub portion 210 and the crankshaft drive sprocket 250 is restrained. In the disengaged position, angular motion of the balance shaft drive sprocket 230 with respect to the hub portion 210 and the crankshaft drive sprocket 250 is permitted.

The locking structure 300 can be moved between the engaged and disengaged positions based on the rotational speed of the hub portion 210. For example, the locking structure 300 can move from the engaged position to the disengaged position in response to rotation of the hub portion 210 above a threshold rotational speed, and can move from the disengaged position to the engaged position when the hub portion 210 decelerates below that rotational speed.

In the illustrated example, the locking structure 300 includes a first aperture 310 and a second aperture 320. The first aperture 310 is formed in the annular flange 220 of the hub portion 210 and extends inward from the radial face 224 of the annular flange 220. The first aperture 310 also extends radially outward, such that the first aperture 310 extends along a line that is non-parallel and non-perpendicular with respect to the axis of the hub portion 210. Thus, a closed end 312 of the first aperture 310 is radially further from the axis of the hub portion 210 than the opening of the first aperture 310 at the radial face 224 of the annular flange 220. The second aperture 320 is formed in the internal face 240 of the balance shaft drive sprocket 230. In the illustrated example, the second aperture 320 is generally semi-spherical, but other geometries can be utilized.

The open ends of the first aperture 310 and the second aperture 320 are aligned radially. When the locking structure 300 is in the engaged position, the open ends of the first aperture 310 and the second aperture 320 are also aligned rotationally. When the locking structure 300 is in the disengaged position, the open ends of the first aperture 310 and the second aperture 320 can move into and out of rotational alignment with respect to each other, in correspondence with angular motion of the balance shaft drive sprocket 230 with respect to the hub portion 210 and the crankshaft drive sprocket 250.

In order to lock and release the balance shaft drive sprocket 230 with respect to the hub portion 210, the locking structure includes an engaging element such as a detent ball 330 that is urged into engagement with the second aperture 320 by a resilient biasing element such as a compression spring 340. In the engaged position of the locking structure 300, the detent ball 330 is seated in the second aperture 320 and partially disposed in the first aperture 310. Because the detent ball 330 spans the interface between the radial face 224 of the annular flange 220 and the internal face 240 of the balance shaft drive sprocket 230 in the engaged position, the balance shaft drive sprocket 230 is restrained from rotating with respect to the hub portion 210 by the mechanical interference caused by the position of the detent ball 330.

Rotation of the hub portion 210 above a threshold rotational speed causes the locking structure 300 to move from the engaged position to the disengaged position. In particular, centrifugal force (i.e. the outward apparent force caused by rotation) acting on the detent ball 330 causes the detent ball to move radially outward. Since the closed end 312 of the first aperture is farther outward radially than the second aperture 320, the detent ball 330 moves into the first aperture 310, toward the closed end 312, against the spring force applied to the detent ball 330 by the compression spring 340. As the detent ball exits the second aperture 320 and no longer spans the interface between the radial face 224 of the annular flange 220 and the internal face 240 of the balance shaft drive sprocket 230, the locking structure 300 reaches the disengaged position and rotation of the balance shaft drive sprocket 230 with respect to the hub portion 210 is permitted. When the rotational speed of the hub portion 210 subsequently drops below the threshold rotation speed, the detent ball 330 moves back into engagement with the second aperture 320 responsive to the spring force applied by the compression spring 340, thus placing the locking structure 300 in the engaged position. The threshold rotational speed can be set by the spring rate of the compression spring 340.

While the description above refers to the locking structure 300 as including the detent ball 330, it should be understood that the detent ball 330 can be replaced by structures of other geometries, such as a cylindrical pin.

Figure 4:
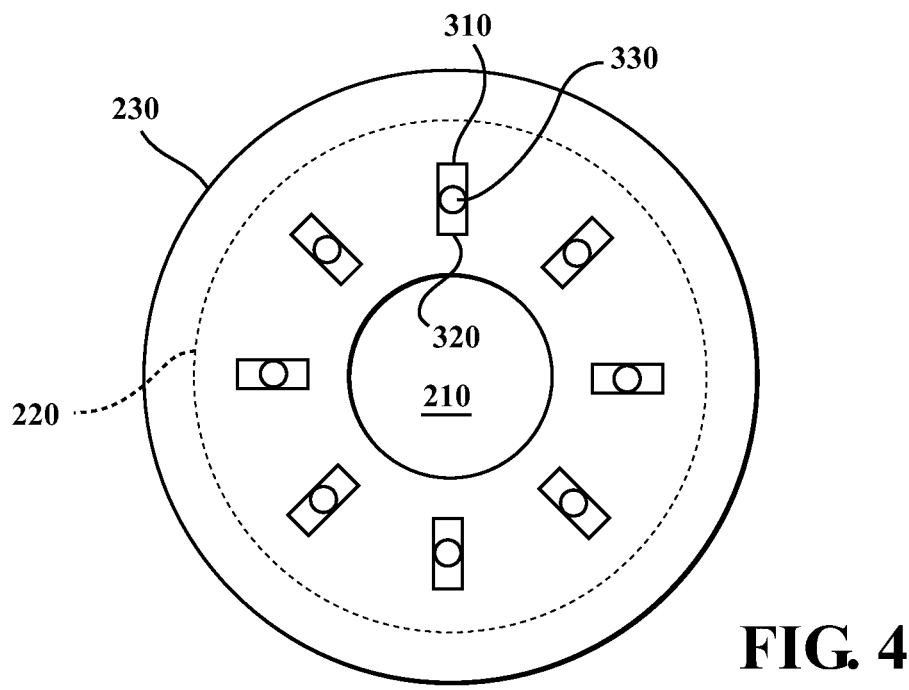
FIG. 4 is a schematic view showing a first example of a radial arrangement for the locking structures of the torsionally compliant sprocket of FIG. 2.
Figure 5:
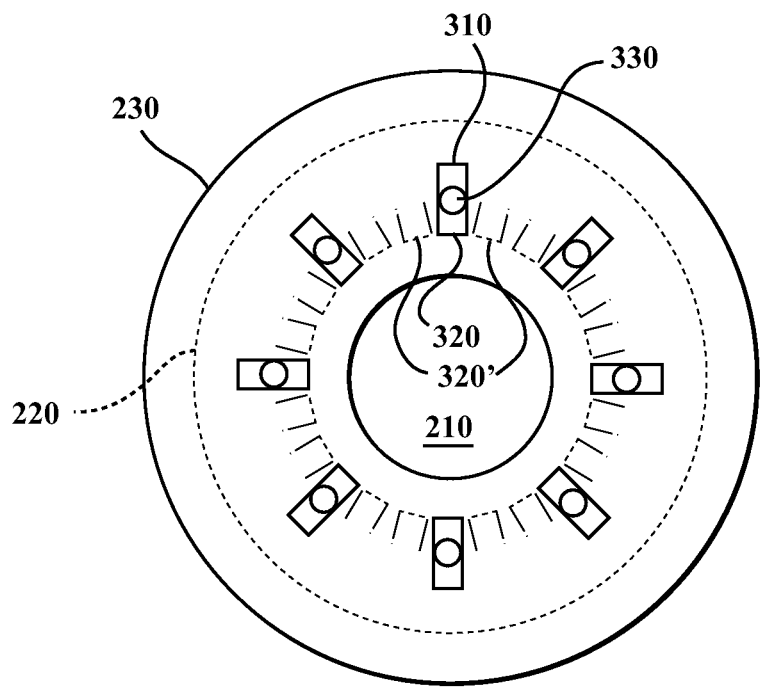
FIG. 5 is a schematic view showing a second example of a radial arrangement for the locking structures of the torsionally compliant sprocket of FIG. 2.

While the description above refers to a single locking structure 300 for ease of the description, it should be understood that multiple similar or identical locking structures 300 can be provided. For example, as shown in FIG. 4, multiple locking structures 300 can be spaced in a radial array on the annular flange 220 and the balance shaft drive sprocket 230. In this example, the detent balls 330 and the second apertures 320 are equal in number, with each detent ball corresponding to a specific one of the second apertures 320. The limited angular range of rotation of the balance shaft drive sprocket 230 with respect to the crankshaft drive sprocket 250 ensures that each detent ball 330 is only able to engage a specific one of the second apertures 320. In another example, as shown in FIG. 5, each of the detent balls 330 is engageable with two or more apertures. As illustrated, each detent ball 330 is engageable with its respective second aperture 320 as well as additional apertures 320'. Each detent ball 330 is aligned with its respective second aperture 320 when the balance shaft drive sprocket 230 is in its neutral position. The additional apertures are positioned with respect to each of the second apertures 320 according to the angular limit of travel of the balance shaft drive sprocket 230 with respect to the crankshaft drive sprocket 250. Because the speed of the balance shaft drive sprocket 230 with respect to the crankshaft drive sprocket 250 will be slower near the angular limit of travel, the chance that the balance shaft drive sprocket 230 will successfully engage one of the additional apertures 320' is enhanced.

Figure 6:
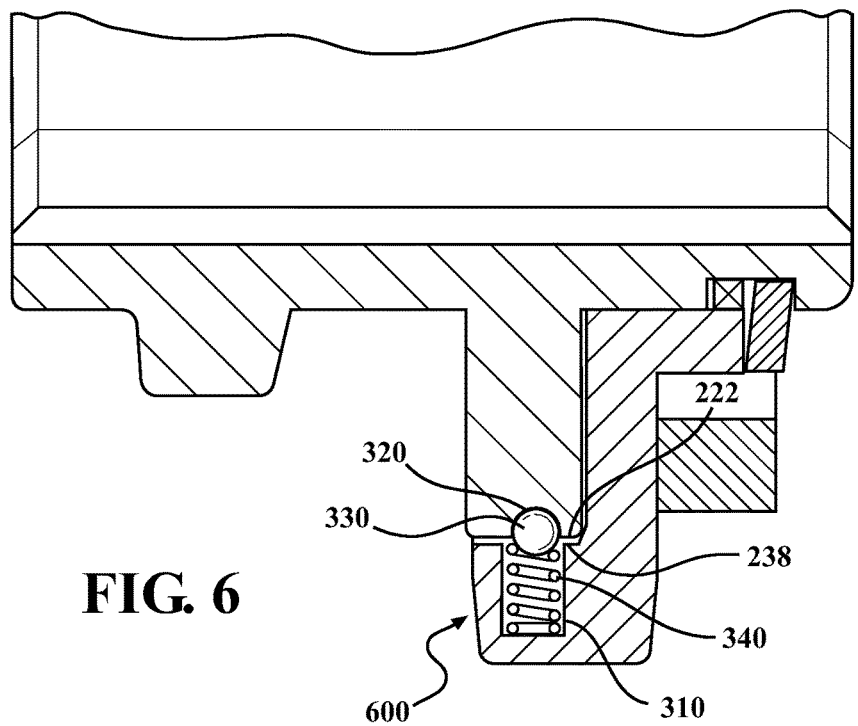
FIG. 6 is a detail view showing a locking structure according to a second example that can be used with the torsionally compliant sprocket of FIG. 2.

FIG. 6 is a detail view showing a locking structure 600 according to a second example that can be used with the torsionally compliant sprocket assembly 200 of FIGS. 2-3. The torsionally compliant sprocket assembly 200 is as described with respect to FIGS. 2-3, except that the locking structure 300 has been replaced by the locking structure 600, and as otherwise described.

The locking structure 600 is similar to the locking structure 300, but has been repositioned such that a first aperture 610 is formed in the balance shaft drive sprocket 230 and the second aperture 320 is formed in the hub portion 210 at the interface between the outer periphery 222 of the annular flange 220 and the second inner surface 238 of the balance shaft drive sprocket 230. The first aperture 610 is oriented perpendicular to the axis of the hub portion 210, such as along a line that extends radially outward from the axis of the hub portion 210. A detent ball 630 and a compression spring 640 cause engagement and disengagement of the locking structure 600 in the manner previously described with respect to the locking structure 300.

Figure 7:
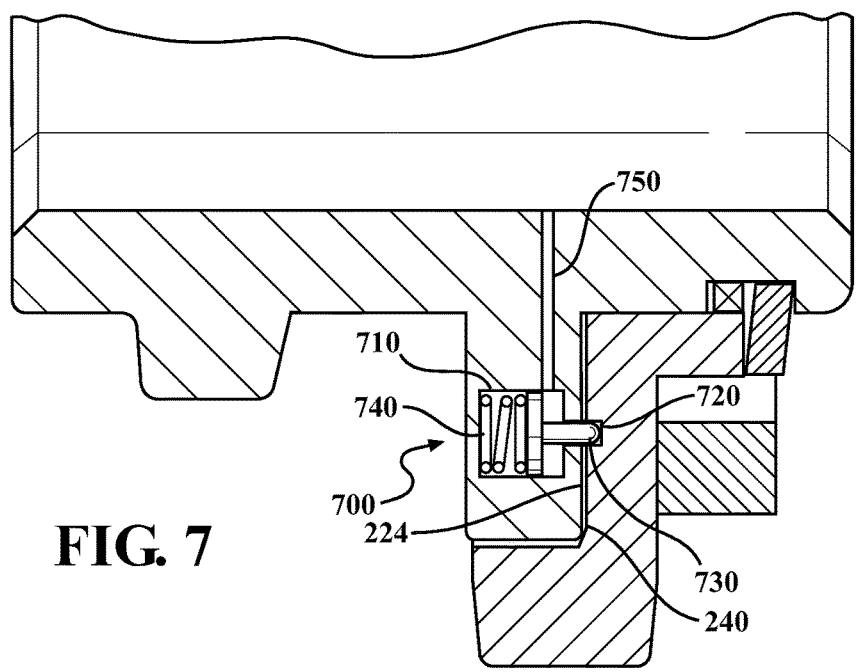
FIG. 7 is a detail view showing a locking structure according to a third example that can be used with the torsionally compliant sprocket of FIG. 2.

FIG. 7 is a detail view showing a locking structure 700 according to a second example that can be used with the torsionally compliant sprocket assembly 200 of FIGS. 2-3. The torsionally compliant sprocket assembly 200 is as described with respect to FIGS. 2-3, except that the locking structure 300 has been replaced by the locking structure 700, and as otherwise described.

The locking structure 700 includes a first aperture 710 formed in the hub portion 210 and a second aperture 720 formed in the balance shaft drive sprocket 230. A pin 730 extends across the interface between the radial face 224 and the internal face 240 in the engaged position, and retracts fully into the first aperture 710 in the disengaged position. The pin 730 is spring biased to the engaged position by a compression spring 740. Opposite the compression spring 740, oil pressure from a supply port 750 enters the first aperture 710. Oil under pressure can be provided to the supply port 750 by, for example, the crankshaft oil supply. When the oil pressure in the first aperture 710 is not sufficient to overcome the spring force of the compression spring 740, the pin 730 is seated partially in the second aperture 720 and the locking structure 700 is in the engaged position. When the oil pressure in the first aperture 710 is sufficient to overcome the biasing force of the compression spring 740, the pin 730 moves into the first aperture 710, placing the locking structure 700 in the disengaged position. In implementations where the oil pressure is provided by the crankshaft oil supply, movement to the disengaged position will occur as a function of rotational speed of the hub portion 210, since engine oil pressure is generally a function of engine speed. In other implementations, a source of oil pressure can be used that allows movement of the locking structure 700 independent of the rotational speed of the hub portion 210, such as by actuating supply of oil to the supply port 750 by a valve.

Although the torsionally compliant sprocket assembly 200 is described above as including the balance shaft drive sprocket 230 and the crankshaft drive sprocket 250, it should be understood that the torsionally compliant sprocket assembly 200 could be used in applications other than crankshaft and balance shaft drive assemblies.

Although the torsionally compliant sprocket assembly 200 is described above as including the balance shaft drive sprocket 230 and the crankshaft drive sprocket 250, it should be understood that the crankshaft drive sprocket 250 could be omitted in applications where the crankshaft drive utilizes a separate sprocket or other structure.

It should be understood that the disclosure above regarding the torsionally compliant sprocket assembly 200 can also be applied to torsionally compliant gears. As one example, one or both of the balance shaft drive sprocket 230 and the crankshaft drive sprocket 250 could be replaced by gear teeth for engagement with a gear train or a toothed belt. As another example, the balance shaft drive sprocket 230 could be replaced by gear teeth for engagement with a gear train or a toothed belt and the crankshaft drive sprocket 250 could be omitted.

It should be understood that the disclosure above regarding the torsionally compliant sprocket assembly 200 can also be applied to torsionally compliant pulleys. For example, one or both of the balance shaft drive sprocket 230 and the crankshaft drive sprocket 250 could be replaced by a pulley for engagement with a belt.

While the disclosure has been made in connection with what is presently considered to be the most practical and preferred embodiment, it should be understood that the disclosure is intended to cover various modifications and equivalent arrangements.

The invention claimed is:

1. A torsionally compliant sprocket system, comprising:
   a first sprocket (250);
   a second sprocket (230) mounted in side-by-side relation to the first sprocket (250);
   a resilient member (270) that resiliently couples the second sprocket (230) to the first sprocket (250) to allow limited angular rotation of the second sprocket (230) with respect to the first sprocket (250); and
   a locking structure (300, 600, 700) that is biased toward an engaged position in which angular motion of the second sprocket (230) with respect to the first sprocket (250) is restrained and moves in response to rotation of the first sprocket (250) to a disengaged position in which angular motion of the second sprocket (230) with respect to the first sprocket (250) is permitted.

2. The torsionally compliant sprocket system of claim 1, further comprising:
   a hub portion (210), wherein the first sprocket (250) is disposed on the hub portion (210) and the second sprocket (230) is disposed on the hub portion (210).

3. The torsionally compliant sprocket system of claim 2, wherein the first sprocket (250) is disposed on the hub portion (210) such that it is restrained from rotating with respect to the hub portion (210).

4. The torsionally compliant sprocket system of claim 3, wherein the first sprocket (250) is formed integrally on the hub portion (210).

5. The torsionally compliant sprocket system of claim 2, wherein the locking structure (300, 600, 700) moves from the engaged position to the disengaged position in response to rotation of the hub portion (210) above a threshold rotational speed and moves from the disengaged position to the engaged position in response to rotation of the hub portion (210) below the threshold rotational speed.

6. The torsionally compliant sprocket system of claim 2, wherein the locking structure (300, 600, 700) includes a first aperture (310) formed in the hub portion (210), a second aperture (320) formed in the second sprocket (230), an engaging element (330) disposed in the first aperture (310), and a biasing element (340) disposed in the first aperture (310), wherein the engaging element (330) is seated in the second aperture (320) when the locking structure (300, 600, 700) is in the engaged position and the engaging element (330) is not seated in the second aperture (320) when the locking structure (300, 600, 700) is in the disengaged position.

7. The torsionally compliant sprocket system of claim 6, wherein the biasing element (340) applies a spring force to the engaging element (330) that urges the engaging element (330) toward the engaged position.

8. The torsionally compliant sprocket system of claim 6, wherein the hub portion (210) extends along an axis and the first aperture (310) extends outward along a line that is non-parallel and non-perpendicular with respect to the axis of the hub portion (210).

9. The torsionally compliant sprocket system of claim 6, wherein the first aperture (310) has a closed end (312) that is located farther outward radially than the second aperture (320).

10. The torsionally compliant sprocket system of claim 2, wherein the locking structure (300, 600, 700) includes a first aperture (310) formed in the second sprocket (230), a second aperture (320) formed in the hub portion (210), an engaging element (330) disposed in the first aperture (310), and a biasing element (340) disposed in the first aperture (310), wherein the engaging element (330) is seated in the second aperture (320) when the locking structure (300, 600, 700) is in the engaged position and the engaging element (330) is not seated in the second aperture (320) when the locking structure (300, 600, 700) is in the disengaged position.

11. The torsionally compliant sprocket system of claim 10, wherein the biasing element (340) applies a spring force to the engaging element (330) that urges the engaging element (330) toward the engaged position.

12. The torsionally compliant sprocket system of claim 10, wherein the hub portion (210) extends along an axis and the first aperture (310) extends radially outward along a line that is perpendicular to the axis of the hub portion (210).

13. The torsionally compliant sprocket system of claim 10, wherein the first aperture (310) has a closed end (312) that is located farther outward radially than the second aperture (320).

14. The torsionally compliant sprocket system of claim 2, wherein the locking structure (300, 600, 700) includes a first aperture (310) formed in the hub portion (210), a second aperture (320) formed in the second sprocket (230), an engaging element (330) disposed in the first aperture (310), a biasing element (340) disposed in the first aperture (310), and an oil supply port (750), wherein the engaging element (330) is seated in the second aperture (320) when the locking structure (300, 600, 700) is in the engaged position and the engaging element (330) is not seated in the second aperture (320) when the locking structure (300, 600, 700) is in the disengaged position, the biasing element (340) applies a spring force to the engaging element (330) that urges the engaging element (330) toward the engaged position, and oil pressure from the oil supply port (750) urges the engaging element (330) toward the disengaged position.

15. A torsionally compliant sprocket system for an engine that includes a crankshaft (110) that rotates on an axis, the torsionally compliant sprocket system comprising:
  a hub portion (210) mounted on the crankshaft (110);
  a crankshaft drive sprocket (250) disposed on the hub portion (210) such that it is restrained from rotating with respect to the hub portion (210);
  a balance shaft drive sprocket (230) disposed on the hub portion (210) in side-by-side relation to the crankshaft drive sprocket (250);
  a resilient member (270) that resiliently couples the balance shaft drive sprocket (230) to the crankshaft drive sprocket (250) to allow limited angular rotation of the balance shaft drive sprocket (230) with respect to the crankshaft drive sprocket (250); and
  a locking structure (300, 600, 700) that is biased toward an engaged position in which angular motion of the balance shaft drive sprocket (230) with respect to the crankshaft drive sprocket (250) is restrained and moves in response to rotation of the crankshaft drive sprocket (250) to a disengaged position in which angular motion of the balance shaft drive sprocket (230) with respect to the crankshaft drive sprocket (250) is permitted, wherein the locking structure (300, 600, 700) moves from the engaged position to the disengaged position in response to rotation of the hub portion (210) above a threshold rotational speed and moves from the disengaged position to the engaged position in response to rotation of the hub portion (210) below the threshold rotational speed.

\* \* \* \* \*